(12) United States Patent
Silverbrook

(10) Patent No.: US 8,123,336 B2
(45) Date of Patent: *Feb. 28, 2012

(54) PRINTHEAD MICRO-ELECTROMECHANICAL NOZZLE ARRANGEMENT WITH MOTION-TRANSMITTING STRUCTURE

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,090

(22) Filed: May 8, 2011

(65) Prior Publication Data

US 2011/0211020 A1  Sep. 1, 2011

Related U.S. Application Data

(63) Continuation of application No. 12/627,997, filed on Nov. 30, 2009, now Pat. No. 7,976,130, which is a continuation of application No. 12/015,261, filed on Jan. 16, 2008, now Pat. No. 7,641,314, which is a continuation of application No. 11/008,115, filed on Dec. 10, 2004, now Pat. No. 7,337,532, which is a continuation of application No. 10/713,071, filed on Nov. 17, 2003, now Pat. No. 6,880,918, which is a continuation of application No. 10/302,275, filed on Nov. 23, 2002, now Pat. No. 6,669,332, which is a continuation of application No. 10/120,347, filed on Apr. 12, 2002, now Pat. No. 6,540,332, which is a continuation-in-part of application No. 09/112,767, filed on Jul. 10, 1998, now Pat. No. 6,416,167.

(30) Foreign Application Priority Data

Jul. 15, 1997  (AU) .......................................... PO7991
Mar. 25, 1998  (AU) .......................................... PP2592

(51) Int. Cl.
*B41J 2/04* (2006.01)
*B41J 2/05* (2006.01)
(52) U.S. Cl. ............................................. 347/54; 347/65
(58) Field of Classification Search .................... 347/20, 347/54, 56, 65
See application file for complete search history.

(56) References Cited

U.S. PATENT DOCUMENTS 1,941,001 A  12/1933  Hansell
(Continued)

FOREIGN PATENT DOCUMENTS

DE  1648322 A  3/1971
(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc, New York, vol. 2, No. 4, Dec. 1, 1993, pp. 146-150, XP000443412, ISSN: 1057-7157.
(Continued)

*Primary Examiner* — An Do

(57) ABSTRACT

A micro-electromechanical nozzle arrangement for a printhead integrated circuit the nozzle arrangement includes a nozzle chamber bounded by a distal sidewall and a proximal sidewall, and capped by a roof defining an ink ejection port; a paddle located in the nozzle chamber below the ink ejection port; an actuator arm positioned outside of the nozzle chamber in the vicinity of the proximal sidewall, the actuator arm having a fixed end fixed to a substrate of the nozzle arrangement and a working end displaceable towards and away from the substrate; and a motion transmitting structure interconnecting the working end of the actuator arm and the paddle. The motion transmitting structure defines part of the proximal sidewall.

5 Claims, 4 Drawing Sheets

U.S. PATENT DOCUMENTS

| | | | |
|---|---|---|---|
| 1,983,690 A | 12/1934 | Behrens | |
| 3,294,212 A | 12/1966 | Gearheart et al. | |
| 3,371,437 A | 3/1968 | Sweet et al. | |
| 3,596,275 A | 7/1971 | Sweet | |
| 3,683,212 A | 8/1972 | Zoltan | |
| 3,747,120 A | 7/1973 | Stemme | |
| 3,946,398 A | 3/1976 | Kyser et al. | |
| 4,007,464 A | 2/1977 | Bassous et al. | |
| 4,053,807 A | 10/1977 | Aozuka et al. | |
| 4,097,873 A | 6/1978 | Martin | |
| 4,111,124 A | 9/1978 | Pascale et al. | |
| 4,225,251 A | 9/1980 | Klimek et al. | |
| 4,350,989 A | 9/1982 | Sagae et al. | |
| 4,370,662 A | 1/1983 | Hou et al. | |
| 4,372,694 A | 2/1983 | Bovio et al. | |
| 4,388,343 A | 6/1983 | Voss et al. | |
| 4,423,401 A | 12/1983 | Mueller | |
| 4,456,804 A | 6/1984 | Lasky et al. | |
| 4,458,255 A | 7/1984 | Giles | |
| 4,459,601 A | 7/1984 | Howkins | |
| 4,480,259 A | 10/1984 | Kruger et al. | |
| 4,490,728 A | 12/1984 | Vaught et al. | |
| 4,535,339 A | 8/1985 | Horike et al. | |
| 4,550,326 A | 10/1985 | Allen et al. | |
| 4,553,393 A | 11/1985 | Ruoff | |
| 4,575,619 A | 3/1986 | Porzky | |
| 4,580,148 A | 4/1986 | Domoto et al. | |
| 4,584,590 A | 4/1986 | Fischbeck et al. | |
| 4,611,219 A | 9/1986 | Sugitani et al. | |
| 4,612,554 A | 9/1986 | Poleshuk | |
| 4,623,965 A | 11/1986 | Wing | |
| 4,628,816 A | 12/1986 | Six | |
| 4,665,307 A | 5/1987 | McWilliams | |
| 4,672,398 A | 6/1987 | Kuwabara et al. | |
| 4,694,308 A | 9/1987 | Chan et al. | |
| 4,696,319 A | 9/1987 | Gant | |
| 4,706,095 A | 11/1987 | Ono et al. | |
| 4,725,157 A | 2/1988 | Nakai et al. | |
| 4,728,392 A | 3/1988 | Miura et al. | |
| 4,733,823 A | 3/1988 | Waggener et al. | |
| 4,737,802 A | 4/1988 | Mielke | |
| 4,746,935 A | 5/1988 | Allen | |
| 4,751,527 A | 6/1988 | Oda | |
| 4,764,041 A | 8/1988 | Bierhoff | |
| 4,784,721 A | 11/1988 | Holmen et al. | |
| 4,812,792 A | 3/1989 | Leibowitz | |
| 4,855,567 A | 8/1989 | Mueller | |
| 4,864,824 A | 9/1989 | Gabriel et al. | |
| 4,870,433 A | 9/1989 | Campbell et al. | |
| 4,887,098 A | 12/1989 | Hawkins et al. | |
| 4,894,664 A | 1/1990 | Tsung Pan | |
| 4,899,180 A | 2/1990 | Elhatem et al. | |
| 4,914,562 A | 4/1990 | Abe et al. | |
| 4,952,950 A | 8/1990 | Bibl et al. | |
| 4,961,821 A | 10/1990 | Drake et al. | |
| 4,962,391 A | 10/1990 | Kitahara et al. | |
| 5,016,023 A | 5/1991 | Chan et al. | |
| 5,029,805 A | 7/1991 | Albarda et al. | |
| 5,048,983 A | 9/1991 | Fukae | |
| 5,051,761 A | 9/1991 | Fisher et al. | |
| 5,057,854 A | 10/1991 | Pond et al. | |
| 5,058,856 A | 10/1991 | Gordon et al. | |
| 5,059,989 A | 10/1991 | Eldridge et al. | |
| 5,072,241 A | 12/1991 | Shibaike et al. | |
| 5,107,276 A | 4/1992 | Kneezel et al. | |
| 5,113,204 A | 5/1992 | Miyazawa et al. | |
| 5,115,374 A | 5/1992 | Hongoh | |
| 5,148,194 A | 9/1992 | Asai et al. | |
| 5,184,907 A | 2/1993 | Hamada et al. | |
| 5,188,464 A | 2/1993 | Aaron | |
| 5,189,473 A | 2/1993 | Negoro et al. | |
| 5,198,836 A | 3/1993 | Saito et al. | |
| 5,211,806 A | 5/1993 | Wong et al. | |
| 5,218,754 A | 6/1993 | Rangappan | |
| 5,245,364 A | 9/1993 | Uchida et al. | |
| 5,255,016 A | 10/1993 | Usui et al. | |
| 5,258,774 A | 11/1993 | Rogers et al. | |
| 5,278,585 A | 1/1994 | Karz et al. | |
| 5,308,442 A | 5/1994 | Taub et al. | |
| 5,317,869 A | 6/1994 | Takeuchi | |
| 5,345,403 A | 9/1994 | Ogawa et al. | |
| 5,358,231 A | 10/1994 | Andela | |
| 5,364,196 A | 11/1994 | Baitz et al. | |
| 5,364,496 A | 11/1994 | Bollinger et al. | |
| 5,387,314 A | 2/1995 | Baughman et al. | |
| 5,397,628 A | 3/1995 | Crawley et al. | |
| 5,406,318 A | 4/1995 | Moore et al. | |
| 5,443,320 A | 8/1995 | Agata et al. | |
| 5,447,442 A | 9/1995 | Swart | |
| 5,448,270 A | 9/1995 | Osborne | |
| 5,459,501 A | 10/1995 | Lee et al. | |
| 5,477,238 A | 12/1995 | Aharanson et al. | |
| 5,494,698 A | 2/1996 | White et al. | |
| 5,508,236 A | 4/1996 | Chiang et al. | |
| 5,513,431 A | 5/1996 | Ohno et al. | |
| 5,519,191 A | 5/1996 | Ketcham et al. | |
| 5,530,792 A | 6/1996 | Ikeda et al. | |
| 5,546,514 A | 8/1996 | Nishiyama | |
| 5,552,812 A | 9/1996 | Ebinuma et al. | |
| 5,565,113 A | 10/1996 | Hadimioglu et al. | |
| 5,565,900 A | 10/1996 | Cowger et al. | |
| 5,581,284 A | 12/1996 | Hermanson | |
| 5,585,792 A | 12/1996 | Liu et al. | |
| 5,605,659 A | 2/1997 | Moynihan et al. | |
| 5,612,723 A | 3/1997 | Shimura et al. | |
| 5,621,524 A | 4/1997 | Mitani | |
| 5,635,966 A | 6/1997 | Keefe et al. | |
| 5,635,968 A | 6/1997 | Baskar et al. | |
| 5,638,104 A | 6/1997 | Suzuki et al. | |
| 5,640,183 A | 6/1997 | Hackleman | |
| 5,646,658 A | 7/1997 | Thiel et al. | |
| 5,659,345 A | 8/1997 | Altendorf | |
| 5,665,249 A | 9/1997 | Burke et al. | |
| 5,666,141 A | 9/1997 | Matoba et al. | |
| 5,675,719 A | 10/1997 | Matias et al. | |
| 5,675,811 A | 10/1997 | Broedner et al. | |
| 5,675,813 A | 10/1997 | Holmdahl | |
| 5,676,475 A | 10/1997 | Dull | |
| 5,684,519 A | 11/1997 | Matoba et al. | |
| 5,697,144 A | 12/1997 | Mitani et al. | |
| 5,719,602 A | 2/1998 | Hackleman et al. | |
| 5,719,604 A | 2/1998 | Inui et al. | |
| 5,726,693 A | 3/1998 | Sharma et al. | |
| 5,738,454 A | 4/1998 | Zepeda et al. | |
| 5,738,799 A | 4/1998 | Hawkins et al. | |
| 5,752,049 A | 5/1998 | Lee | |
| 5,752,303 A | 5/1998 | Thiel | |
| 5,757,407 A | 5/1998 | Rezanka | |
| 5,771,054 A | 6/1998 | Dudek et al. | |
| 5,781,202 A | 7/1998 | Silverbrook | |
| 5,781,331 A | 7/1998 | Carr et al. | |
| 5,790,154 A | 8/1998 | Mitani et al. | |
| 5,801,727 A | 9/1998 | Torpey | |
| 5,802,686 A | 9/1998 | Shimada et al. | |
| 5,804,083 A | 9/1998 | Ishii et al. | |
| 5,812,159 A | 9/1998 | Anagnostopoulos et al. | |
| 5,821,962 A | 10/1998 | Kudo et al. | |
| 5,825,275 A | 10/1998 | Wuttig et al. | |
| 5,828,394 A | 10/1998 | Khuri-Yakub et al. | |
| 5,838,351 A | 11/1998 | Weber | |
| 5,841,452 A | 11/1998 | Silverbrook | |
| 5,845,144 A | 12/1998 | Tateyama et al. | |
| 5,850,240 A | 12/1998 | Kubatzki et al. | |
| 5,850,242 A | 12/1998 | Asaba | |
| 5,851,412 A | 12/1998 | Kubby | |
| 5,872,582 A | 2/1999 | Pan | |
| 5,877,580 A | 3/1999 | Swierkowski | |
| 5,883,650 A | 3/1999 | Figueredo et al. | |
| 5,889,541 A | 3/1999 | Bobrow et al. | |
| 5,896,155 A | 4/1999 | Lebens et al. | |
| 5,897,789 A | 4/1999 | Weber | |
| 5,903,380 A | 5/1999 | Motamedi et al. | |
| 5,909,230 A | 6/1999 | Choi et al. | |
| 5,912,684 A | 6/1999 | Fujii et al. | |
| 5,940,096 A | 8/1999 | Komplin et al. | |
| 5,980,719 A | 11/1999 | Cherukuri et al. | |
| 5,994,816 A | 11/1999 | Dhuler et al. | |

| | | | |
|---|---|---|---|
| 6,000,781 A | 12/1999 | Akiyama et al. | |
| 6,003,668 A | 12/1999 | Joyce | |
| 6,003,977 A | 12/1999 | Weber et al. | |
| 6,007,187 A | 12/1999 | Kashino et al. | |
| 6,019,457 A | 2/2000 | Silverbrook | |
| 6,022,099 A | 2/2000 | Chwalek et al. | |
| 6,022,104 A | 2/2000 | Lin et al. | |
| 6,022,482 A | 2/2000 | Chen et al. | |
| 6,027,205 A | 2/2000 | Herbert | |
| 6,041,600 A | 3/2000 | Silverbrook | |
| 6,062,681 A | 5/2000 | Field et al. | |
| 6,067,797 A | 5/2000 | Silverbrook | |
| 6,068,367 A | 5/2000 | Fabbri | |
| 6,070,967 A | 6/2000 | Bern | |
| 6,074,043 A | 6/2000 | Ahn | |
| 6,076,913 A | 6/2000 | Garcia et al. | |
| 6,079,821 A | 6/2000 | Chwalek et al. | |
| 6,084,609 A | 7/2000 | Manini et al. | |
| 6,087,638 A | 7/2000 | Silverbrook | |
| 6,092,889 A | 7/2000 | Nakamoto et al. | |
| 6,106,115 A | 8/2000 | Mueller et al. | |
| 6,120,124 A | 9/2000 | Atobe et al. | |
| 6,123,316 A | 9/2000 | Biegelsen et al. | |
| 6,126,846 A | 10/2000 | Silverbrook | |
| 6,130,967 A | 10/2000 | Lee et al. | |
| 6,143,432 A | 11/2000 | de Rochemont et al. | |
| 6,151,049 A | 11/2000 | Karita et al. | |
| 6,155,676 A | 12/2000 | Etheridge et al. | |
| 6,171,875 B1 | 1/2001 | Silverbrook | |
| 6,174,050 B1 | 1/2001 | Kashino et al. | |
| 6,180,427 B1 | 1/2001 | Silverbrook | |
| 6,183,067 B1 | 2/2001 | Matta | |
| 6,188,415 B1 | 2/2001 | Silverbrook | |
| 6,191,405 B1 | 2/2001 | Mishima et al. | |
| 6,209,989 B1 | 4/2001 | Silverbrook | |
| 6,211,598 B1 | 4/2001 | Dhuler et al. | |
| 6,213,589 B1 | 4/2001 | Silverbrook | |
| 6,217,183 B1 | 4/2001 | Shipman | |
| 6,220,694 B1 | 4/2001 | Silverbrook | |
| 6,228,668 B1 | 5/2001 | Silverbrook | |
| 6,229,622 B1 | 5/2001 | Takeda | |
| 6,231,772 B1 | 5/2001 | Silverbrook | |
| 6,234,472 B1 | 5/2001 | Juan | |
| 6,234,608 B1 | 5/2001 | Genovese et al. | |
| 6,238,040 B1 | 5/2001 | Silverbrook | |
| 6,238,113 B1 | 5/2001 | Dodge | |
| 6,239,821 B1 | 5/2001 | Silverbrook | |
| 6,241,906 B1 | 6/2001 | Silverbrook | |
| 6,243,113 B1 | 6/2001 | Silverbrook | |
| 6,244,691 B1 | 6/2001 | Silverbrook | |
| 6,245,246 B1 | 6/2001 | Silverbrook | |
| 6,245,247 B1 | 6/2001 | Silverbrook | |
| 6,247,789 B1 | 6/2001 | Sanada | |
| 6,247,790 B1 | 6/2001 | Silverbrook | |
| 6,247,791 B1 | 6/2001 | Silverbrook | |
| 6,247,792 B1 | 6/2001 | Silverbrook | |
| 6,247,795 B1 | 6/2001 | Silverbrook | |
| 6,247,796 B1 | 6/2001 | Silverbrook | |
| 6,254,793 B1 | 7/2001 | Silverbrook | |
| 6,258,285 B1 | 7/2001 | Silverbrook | |
| 6,264,849 B1 | 7/2001 | Silverbrook | |
| 6,267,904 B1 | 7/2001 | Silverbrook | |
| 6,274,056 B1 | 8/2001 | Silverbrook | |
| 6,283,582 B1 | 9/2001 | Silverbrook | |
| 6,290,332 B1 | 9/2001 | Crystal et al. | |
| 6,290,862 B1 | 9/2001 | Silverbrook | |
| 6,293,652 B1 | 9/2001 | Arashima et al. | |
| 6,294,101 B1 | 9/2001 | Silverbrook | |
| 6,297,577 B1 | 10/2001 | Hotomi et al. | |
| 6,302,528 B1 | 10/2001 | Silverbrook | |
| 6,305,773 B1 | 10/2001 | Burr et al. | |
| 6,306,671 B1 | 10/2001 | Silverbrook | |
| 6,312,099 B1 | 11/2001 | Hawkins et al. | |
| 6,315,470 B1 | 11/2001 | Vaghi | |
| 6,322,195 B1 | 11/2001 | Silverbrook | |
| 6,331,043 B1 | 12/2001 | Shimazu et al. | |
| 6,331,258 B1 | 12/2001 | Silverbrook | |
| 6,341,845 B1 | 1/2002 | Scheffelin et al. | |
| 6,352,337 B1 | 3/2002 | Sharma | |
| 6,357,115 B1 | 3/2002 | Takatsuka et al. | |
| 6,361,230 B1 | 3/2002 | Crystal et al. | |
| 6,416,167 B1 | 7/2002 | Silverbrook | |
| 6,416,168 B1 | 7/2002 | Silverbrook | |
| 6,426,014 B1 | 7/2002 | Silverbrook | |
| 6,435,667 B1 | 8/2002 | Silverbrook | |
| 6,443,555 B1 | 9/2002 | Silverbrook et al. | |
| 6,451,216 B1 | 9/2002 | Silverbrook | |
| 6,452,588 B2 | 9/2002 | Griffin et al. | |
| 6,464,415 B1 | 10/2002 | Vaghi | |
| 6,467,870 B2 | 10/2002 | Matsumoto et al. | |
| 6,471,336 B2 | 10/2002 | Silverbrook | |
| 6,474,882 B1 | 11/2002 | Vaghi | |
| 6,477,794 B1 | 11/2002 | Hoffmann | |
| 6,485,123 B2 | 11/2002 | Silverbrook | |
| 6,488,358 B2 | 12/2002 | Silverbrook | |
| 6,488,359 B2 | 12/2002 | Silverbrook | |
| 6,488,360 B2 | 12/2002 | Silverbrook | |
| 6,502,306 B2 | 1/2003 | Silverbrook | |
| 6,505,912 B2 | 1/2003 | Silverbrook | |
| 6,513,908 B2 | 2/2003 | Silverbrook | |
| 6,536,874 B1 | 3/2003 | Silverbrook | |
| 6,540,332 B2 | 4/2003 | Silverbrook | |
| 6,555,201 B1 | 4/2003 | Dhuler et al. | |
| 6,561,627 B2 | 5/2003 | Jarrold et al. | |
| 6,561,635 B1 | 5/2003 | Wen | |
| 6,582,059 B2 | 6/2003 | Silverbrook | |
| 6,588,882 B2 | 7/2003 | Silverbrook | |
| 6,598,960 B1 | 7/2003 | Cabal et al. | |
| 6,639,488 B2 | 10/2003 | Deligianni et al. | |
| 6,641,315 B2 | 11/2003 | King et al. | |
| 6,644,767 B2 | 11/2003 | Silverbrook | |
| 6,644,786 B1 | 11/2003 | Lebens | |
| 6,666,543 B2 | 12/2003 | Silverbrook | |
| 6,669,332 B2 | 12/2003 | Silverbrook | |
| 6,669,333 B1 | 12/2003 | Silverbrook | |
| 6,672,706 B2 | 1/2004 | Silverbrook | |
| 6,679,584 B2 | 1/2004 | Silverbrook | |
| 6,682,174 B2 | 1/2004 | Silverbrook | |
| 6,685,302 B2 | 2/2004 | Haluzak et al. | |
| 6,685,303 B1 | 2/2004 | Trauernicht et al. | |
| 6,715,949 B1 | 4/2004 | Fisher et al. | |
| 6,720,851 B2 | 4/2004 | Halljorner et al. | |
| 6,736,490 B2 | 5/2004 | Sugioka | |
| 6,783,217 B2 | 8/2004 | Silverbrook | |
| 6,786,570 B2 | 9/2004 | Silverbrook | |
| 6,786,661 B2 | 9/2004 | King et al. | |
| 6,792,754 B2 | 9/2004 | Silverbrook | |
| 6,808,325 B2 | 10/2004 | King et al. | |
| 6,824,251 B2 | 11/2004 | Silverbrook | |
| 6,830,395 B2 | 12/2004 | Silverbrook | |
| 6,832,828 B2 | 12/2004 | Silverbrook | |
| 6,834,939 B2 | 12/2004 | Silverbrook | |
| 6,840,600 B2 | 1/2005 | Silverbrook | |
| 6,848,780 B2 | 2/2005 | Silverbrook | |
| 6,855,264 B1 | 2/2005 | Silverbrook | |
| 6,857,724 B2 | 2/2005 | Silverbrook | |
| 6,857,730 B2 | 2/2005 | Silverbrook | |
| 6,866,369 B2 | 3/2005 | Silverbrook | |
| 6,874,866 B2 | 4/2005 | Silverbrook | |
| 6,880,918 B2 | 4/2005 | Silverbrook | |
| 6,886,917 B2 | 5/2005 | Silverbrook et al. | |
| 6,886,918 B2 | 5/2005 | Silverbrook et al. | |
| 6,913,346 B2 | 7/2005 | Silverbrook et al. | |
| 6,916,082 B2 | 7/2005 | Silverbrook | |
| 6,918,707 B2 | 7/2005 | King et al. | |
| 6,921,221 B2 | 7/2005 | King et al. | |
| 6,923,583 B2 | 8/2005 | King et al. | |
| 6,929,352 B2 | 8/2005 | Silverbrook | |
| 6,932,459 B2 | 8/2005 | Silverbrook | |
| 6,945,630 B2 | 9/2005 | Silverbrook | |
| 6,948,799 B2 | 9/2005 | Silverbrook | |
| 6,953,295 B2 | 10/2005 | King et al. | |
| 6,959,981 B2 | 11/2005 | Silverbrook et al. | |
| 6,966,625 B2 | 11/2005 | Silverbrook et al. | |
| 6,969,153 B2 | 11/2005 | Silverbrook et al. | |
| 6,979,075 B2 | 12/2005 | Silverbrook et al. | |
| 6,986,613 B2 | 1/2006 | King et al. | |
| 6,988,787 B2 | 1/2006 | Silverbrook | |

| | | |
|---|---|---|
| 6,988,788 B2 | 1/2006 | Silverbrook |
| 6,988,841 B2 | 1/2006 | King et al. |
| 6,994,420 B2 | 2/2006 | Silverbrook |
| 7,004,566 B2 | 2/2006 | Silverbrook |
| 7,008,046 B2 | 3/2006 | Silverbrook |
| 7,011,390 B2 | 3/2006 | Silverbrook et al. |
| 7,055,934 B2 | 6/2006 | Silverbrook |
| 7,055,935 B2 | 6/2006 | Silverbrook |
| 7,077,507 B2 | 7/2006 | Silverbrook |
| 7,077,508 B2 | 7/2006 | Silverbrook |
| 7,077,588 B2 | 7/2006 | King et al. |
| 7,083,264 B2 | 8/2006 | Silverbrook |
| 7,090,337 B2 | 8/2006 | Silverbrook |
| 7,101,096 B2 | 9/2006 | Sasai et al. |
| 7,111,925 B2 | 9/2006 | Silverbrook |
| 7,131,715 B2 | 11/2006 | Silverbrook |
| 7,134,740 B2 | 11/2006 | Silverbrook |
| 7,134,745 B2 | 11/2006 | Silverbrook |
| 7,144,098 B2 | 12/2006 | Silverbrook |
| 7,147,302 B2 | 12/2006 | Silverbrook |
| 7,147,303 B2 | 12/2006 | Silverbrook et al. |
| 7,147,305 B2 | 12/2006 | Silverbrook |
| 7,147,791 B2 | 12/2006 | Silverbrook |
| 7,156,494 B2 | 1/2007 | Silverbrook et al. |
| 7,156,495 B2 | 1/2007 | Silverbrook et al. |
| 7,179,395 B2 | 2/2007 | Silverbrook et al. |
| 7,182,436 B2 | 2/2007 | Silverbrook et al. |
| 7,188,933 B2 | 3/2007 | Silverbrook et al. |
| 7,195,339 B2 | 3/2007 | Silverbrook |
| 7,217,048 B2 | 5/2007 | King et al. |
| 7,246,883 B2 | 7/2007 | Silverbrook |
| 7,264,335 B2 | 9/2007 | Silverbrook et al. |
| 7,270,492 B2 | 9/2007 | King et al. |
| 7,278,711 B2 | 10/2007 | Silverbrook |
| 7,278,712 B2 | 10/2007 | Silverbrook |
| 7,278,796 B2 | 10/2007 | King et al. |
| 7,284,838 B2 | 10/2007 | Silverbrook et al. |
| 7,287,834 B2 | 10/2007 | Silverbrook |
| 7,303,254 B2 | 12/2007 | Silverbrook |
| 7,322,679 B2 | 1/2008 | Silverbrook |
| 7,334,873 B2 | 2/2008 | Silverbrook |
| 7,347,536 B2 | 3/2008 | Silverbrook et al. |
| 7,364,271 B2 | 4/2008 | Silverbrook |
| 7,367,729 B2 | 5/2008 | King et al. |
| 7,401,902 B2 | 7/2008 | Silverbrook |
| 7,416,282 B2 | 8/2008 | Silverbrook |
| 7,438,391 B2 | 10/2008 | Silverbrook et al. |
| 7,465,023 B2 | 12/2008 | Silverbrook |
| 7,465,027 B2 | 12/2008 | Silverbrook |
| 7,465,029 B2 | 12/2008 | Silverbrook et al. |
| 7,465,030 B2 | 12/2008 | Silverbrook |
| 7,467,855 B2 | 12/2008 | Silverbrook |
| 7,470,003 B2 | 12/2008 | Silverbrook |
| 7,506,965 B2 | 3/2009 | Silverbrook |
| 7,506,969 B2 | 3/2009 | Silverbrook |
| 7,517,057 B2 | 4/2009 | Silverbrook |
| 7,520,593 B2 | 4/2009 | Silverbrook et al. |
| 7,520,594 B2 | 4/2009 | Silverbrook |
| 7,533,967 B2 | 5/2009 | Silverbrook et al. |
| 7,537,301 B2 | 5/2009 | Silverbrook |
| 7,537,314 B2 | 5/2009 | Silverbrook |
| 7,549,731 B2 | 6/2009 | Silverbrook |
| 7,556,351 B2 | 7/2009 | Silverbrook |
| 7,556,355 B2 | 7/2009 | Silverbrook |
| 7,556,356 B1 | 7/2009 | Silverbrook |
| 7,562,967 B2 | 7/2009 | Silverbrook et al. |
| 7,566,114 B2 | 7/2009 | Silverbrook |
| 7,568,790 B2 | 8/2009 | Silverbrook et al. |
| 7,568,791 B2 | 8/2009 | Silverbrook |
| 7,578,582 B2 | 8/2009 | Silverbrook |
| 7,604,323 B2 | 10/2009 | Silverbrook et al. |
| 7,611,227 B2 | 11/2009 | Silverbrook |
| 7,628,471 B2 | 12/2009 | Silverbrook |
| 7,637,594 B2 | 12/2009 | Silverbrook et al. |
| 7,641,314 B2 * | 1/2010 | Silverbrook .......... 347/54 |
| 7,641,315 B2 | 1/2010 | Silverbrook |
| 7,669,973 B2 | 3/2010 | Silverbrook et al. |
| 7,708,386 B2 | 5/2010 | Silverbrook et al. |
| 7,717,543 B2 | 5/2010 | Silverbrook |
| 7,758,161 B2 | 7/2010 | Silverbrook et al. |
| 7,780,269 B2 | 8/2010 | Silverbrook |
| 7,802,871 B2 | 9/2010 | Silverbrook |
| 7,850,282 B2 | 12/2010 | Silverbrook |
| 7,891,779 B2 | 2/2011 | Silverbrook |
| 7,901,048 B2 | 3/2011 | Silverbrook |
| 7,901,049 B2 | 3/2011 | Silverbrook |
| 2001/0000447 A1 | 4/2001 | Thompson |
| 2001/0006394 A1 | 7/2001 | Silverbrook |
| 2001/0007461 A1 | 7/2001 | Silverbrook |
| 2001/0008406 A1 | 7/2001 | Silverbrook |
| 2001/0008409 A1 | 7/2001 | Sliverbrook |
| 2001/0009430 A1 | 7/2001 | Silverbrook |
| 2001/0017089 A1 | 8/2001 | Fujii et al. |
| 2001/0024590 A1 | 9/2001 | Woodman et al. |
| 2002/0089695 A1 | 7/2002 | Kubota |
| 2002/0180834 A1 | 12/2002 | Silverbrook |
| 2003/0095726 A1 | 5/2003 | Kia et al. |
| 2003/0103106 A1 | 6/2003 | Silverbrook |
| 2003/0103109 A1 | 6/2003 | Silverbrook |
| 2003/0231227 A1 | 12/2003 | Kim |
| 2004/0070648 A1 | 4/2004 | Silverbrook |
| 2004/0088468 A1 | 5/2004 | Hasegawa |
| 2004/0095436 A1 | 5/2004 | Silverbrook |
| 2004/0257403 A1 | 12/2004 | Silverbrook |
| 2005/0128252 A1 | 6/2005 | Silverbrook |
| 2005/0140727 A1 | 6/2005 | Silverbrook |
| 2005/0226668 A1 | 10/2005 | King et al. |
| 2005/0232676 A1 | 10/2005 | King et al. |
| 2007/0097194 A1 | 5/2007 | Silverbrook |
| 2008/0204514 A1 | 8/2008 | Silverbrook |
| 2008/0316269 A1 | 12/2008 | Silverbrook et al. |

FOREIGN PATENT DOCUMENTS

| | | |
|---|---|---|
| DE | 1648322 A1 | 3/1971 |
| DE | 2905063 A | 8/1980 |
| DE | 2905063 A1 | 8/1980 |
| DE | 3245283 A | 6/1984 |
| DE | 3430155 A | 2/1986 |
| DE | 8802281 U1 | 5/1988 |
| DE | 3716996 A | 12/1988 |
| DE | 3716996 A1 | 12/1988 |
| DE | 3934280 A | 4/1990 |
| DE | 4031248 A1 | 4/1992 |
| DE | 4328433 A | 3/1995 |
| DE | 19516997 A | 11/1995 |
| DE | 19516997 A1 | 11/1995 |
| DE | 19517969 A | 11/1995 |
| DE | 19517969 A1 | 11/1995 |
| DE | 19532913 A | 3/1996 |
| DE | 19623620 A1 | 12/1996 |
| DE | 19639717 A | 4/1997 |
| DE | 19639717 A1 | 4/1997 |
| EP | 0092229 A | 10/1983 |
| EP | 0398031 A | 11/1990 |
| EP | 0416540 A2 | 3/1991 |
| EP | 0427291 A | 5/1991 |
| EP | 0431338 A | 6/1991 |
| EP | 04-118241 A | 4/1992 |
| EP | 0478956 A | 4/1992 |
| EP | 0506232 A | 9/1992 |
| EP | 0510648 A | 10/1992 |
| EP | 0627314 A | 12/1994 |
| EP | 0634273 A | 1/1995 |
| EP | 0634273 A2 | 1/1995 |
| EP | 0713774 A2 | 5/1996 |
| EP | 0737580 A | 10/1996 |
| EP | 0750993 A | 1/1997 |
| EP | 0882590 A | 12/1998 |
| FR | 2231076 A | 12/1974 |
| GB | 792145 A | 3/1958 |
| GB | 1428239 A | 3/1976 |
| GB | 2227020 A | 7/1990 |
| GB | 2262152 A | 9/1993 |
| JP | 56-010472 | 2/1981 |
| JP | 58-112747 A | 7/1983 |
| JP | 58-116165 A | 7/1983 |
| JP | 61-025849 A | 2/1986 |
| JP | 61-268453 A | 11/1986 |

| | | |
|---|---|---|
| JP | 62-094347 | 4/1987 |
| JP | 01-048124 A | 2/1989 |
| JP | 01-105746 A | 4/1989 |
| JP | 01-115639 A | 5/1989 |
| JP | 01-115693 A | 5/1989 |
| JP | 01-128839 A | 5/1989 |
| JP | 01-257058 A | 10/1989 |
| JP | 01-306254 A | 12/1989 |
| JP | 02-030543 A | 1/1990 |
| JP | 02-050841 A | 2/1990 |
| JP | 02-092643 A | 4/1990 |
| JP | 02-108544 A | 4/1990 |
| JP | 02-158348 A | 6/1990 |
| JP | 02-162049 A | 6/1990 |
| JP | 02-265752 A | 10/1990 |
| JP | 03-009846 | 1/1991 |
| JP | 03-009846 A | 1/1991 |
| JP | 03-065348 A | 3/1991 |
| JP | 0416540 | 3/1991 |
| JP | 03-112662 A | 5/1991 |
| JP | 03-153359 A | 7/1991 |
| JP | 403153359 A | 7/1991 |
| JP | 03-180350 A | 8/1991 |
| JP | 03-213346 A | 9/1991 |
| JP | 403292147 A | 12/1991 |
| JP | 04-001051 | 1/1992 |
| JP | 04-001051 A | 1/1992 |
| JP | 04-126255 A | 4/1992 |
| JP | 04-141429 A | 5/1992 |
| JP | 404325257 | 11/1992 |
| JP | 404325257 A | 11/1992 |
| JP | 04-353458 A | 12/1992 |
| JP | 04-368851 A | 12/1992 |
| JP | 05-108278 | 4/1993 |
| JP | 05-284765 A | 10/1993 |
| JP | 05-318724 A | 12/1993 |
| JP | 405318724 | 12/1993 |
| JP | 06-091865 A | 4/1994 |
| JP | 06-091866 A | 4/1994 |
| JP | 07-125241 A | 5/1995 |
| JP | 07-314665 A | 4/1996 |
| JP | 08-142323 | 6/1996 |
| JP | 08-336965 | 12/1996 |
| JP | 411034328 A | 2/1999 |
| JP | 11212703 A | 8/1999 |
| WO | WO 94/18010 A | 8/1994 |
| WO | WO 96/32260 | 10/1996 |
| WO | WO 96/32283 | 10/1996 |
| WO | WO 97/12689 A | 4/1997 |
| WO | WO 99/03681 | 1/1999 |
| WO | WO 99/03681 A1 | 1/1999 |

OTHER PUBLICATIONS

Egawa et al., "Micro-Electro Mechanical Systems" IEEE Catalog No. 90CH2832-4, Feb. 1990, pp. 166-171.

Hirata et al., "An Ink-jet Head Using Diaphragm Microactuator" Sharp Corporation, Jun. 1996, pp. 418-423.

Noworolski J M et al: "Process for in-plane and out-of-plane single-crystal-silicon thermal microactuators" Sensors And Actuators A, Ch. Elsevier Sequoia S.A., Lausane, vol. 55, No. 1, Jul. 15, 1996, pp. 65-69, XP004077979.

Smith et al, "Ink Jet Pump" IBM Technical Disclosure Bulletin, vol. 20 , No. 2, Jul. 1977, pp. 560-562.

Wolf, Stanley, "Silicon Processing for the VLSI Era: Colume 1 Process Technology" 2nd Edition, 2000 pp. 489.

Yamagata, Yutaka et al, "A Micro Mobile Mechanism Using Thermal Expansion and its Theoretical Analysis". Proceedings of the workshop on micro electro mechanical systems (MEMS), US, New York, IEEE, vol. Workshop 7, Jan. 25, 1994, pp. 142-147, XP000528408, ISBN: 0-7803-1834-X.

* cited by examiner

PRINTHEAD MICRO-ELECTROMECHANICAL NOZZLE ARRANGEMENT WITH MOTION-TRANSMITTING STRUCTURE

CROSS REFERENCE TO RELATED APPLICATION

The present application is a Continuation of U.S. application Ser. No. 12/627,997 filed Nov. 30, 2009, now issued U.S. Pat. No. 7,976,130, which is a Continuation of U.S. application Ser. No. 12/015,261 filed on Jan. 16, 2008, now issued U.S. Pat. No. 7,641,314, which is a Continuation of U.S. application Ser. No. 11/008,115 filed on Dec. 10, 2004, now issued U.S. Pat. No. 7,337,532, which is a Continuation of U.S. application Ser. No. 10/713,071 filed on Nov. 17, 2003, now issued U.S. Pat. No. 6,880,918, which is a Continuation of U.S. application Ser. No. 10/302,275 filed on Nov. 23, 2002, now issued U.S. Pat. No. 6,669,332, which is a Continuation of U.S. application Ser. No. 10/120,347 filed on Apr. 12, 2002, now issued U.S. Pat. No. 6,540,332 which is a Continuation-In-Part of U.S. application Ser. No. 09/112,767 filed on Jul. 10, 1998, now issued U.S. Pat. No. 6,416,167, the entire contents of which are herein incorporated by reference.

FIELD OF THE INVENTION

This invention relates to a micro-electromechanical device. More particularly, this invention relates to a micro-electromechanical device that incorporates a motion-transmitting structure.

REFERENCED PATENT APPLICATIONS

The following patents/patent applications are incorporated by reference.

| | | | | | |
|---|---|---|---|---|---|
| 6,362,868 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 |
| 6,247,794 | 6,234,610 | 6,247,793 | 6,264,306 | 6,241,342 | 6,247,792 |
| 6,264,307 | 6,254,220 | 6,234,611 | 6,302,528 | 6,283,582 | 6,239,821 |
| 6,338,547 | 6,247,796 | 6,557,977 | 6,390,603 | 6,362,843 | 6,293,653 |
| 6,312,107 | 6,227,653 | 6,234,609 | 6,238,040 | 6,188,415 | 6,227,654 |
| 6,209,989 | 6,247,791 | 6,336,710 | 6,217,153 | 6,416,167 | 6,243,113 |
| 6,283,581 | 6,247,790 | 6,260,953 | 6,267,469 | 6,273,544 | 6,309,048 |
| 6,420,196 | 6,443,558 | 6,439,689 | 6,378,989 | 6,848,181 | 6,634,735 |
| 6,623,101 | 6,406,129 | 6,505,916 | 6,457,809 | 6,550,895 | 6,457,812 |
| 6,428,133 | 6,485,123 | 6,425,657 | 6,488,358 | 7,021,746 | 6,712,986 |
| 6,981,757 | 6,505,912 | 6,439,694 | 6,364,461 | 6,378,990 | 6,425,658 |
| 6,488,361 | 6,814,429 | 6,471,336 | 6,457,813 | 6,540,331 | 6,454,396 |
| 6,464,325 | 6,443,559 | 6,435,664 | 6,488,360 | 6,550,896 | 6,439,695 |
| 6,447,100 | 7,381,340 | 6,488,359 | 6,618,117 | 6,803,989 | 7,044,589 |
| 6,416,154 | 6,547,364 | 6,644,771 | 6,565,181 | 6,857,719 | 6,702,417 |
| 6,918,654 | 6,616,271 | 6,623,108 | 6,625,874 | 6,547,368 | 6,508,546 |

BACKGROUND OF THE INVENTION

As set out in the above referenced applications/patents, the Applicant has spent a substantial amount of time and effort in developing printheads that incorporate micro electro-mechanical system (MEMS)-based components to achieve the ejection of ink necessary for printing.

As a result of the Applicant's research and development, the Applicant has been able to develop printheads having one or more printhead chips that together incorporate up to 84 000 nozzle arrangements. The Applicant has also developed suitable processor technology that is capable of controlling operation of such printheads. In particular, the processor technology and the printheads are capable of cooperating to generate resolutions of 1600 dpi and higher in some cases. Examples of suitable processor technology are provided in the above referenced patent applications/patents.

Common to most of the printhead chips that the Applicant has developed is a component that moves with respect to a substrate to eject ink from a nozzle chamber. This component can be in the form of an ink-ejecting member that is displaceable in a nozzle chamber to eject the ink from the nozzle chamber.

A particular difficulty that the Applicant has been faced with is to achieve a suitable interface between a prime mover in the form of an actuator and the moving component. This interface is required to permit the moving component to be displaced in the nozzle chamber and to inhibit leakage of ink from the nozzle chamber.

As set out in the above referenced patents/patent applications, the printhead chip is manufactured using integrated circuit fabrication techniques. This is the usual manner in which MEMS-based devices are fabricated. Such forms of fabrication are subject to constraints since they involve successive deposition and etching techniques. It follows that MEMS-based devices are usually formed in layers and that components having relatively complex shapes are difficult and expensive to fabricate.

In FIG. 1, reference numeral 10 generally indicates part of a nozzle arrangement of a printhead chip. The part 10 shown illustrates an actuator 12 and an ink-ejecting member 14. The actuator 12 includes an elongate actuator arm 16 that extends from an anchor 18. The actuator arm 16 is configured so that, when it receives a drive signal, the actuator arm 16 bends towards a substrate 20 as indicated by an arrow 22. A connecting formation 24 is interposed between the actuator arm 16 and the ink-ejecting member 14. Thus, when the actuator arm 16 is bent towards the substrate 20, the ink-ejecting member 14 is displaced in the direction of an arrow 26 to eject ink from the nozzle chamber.

It would be intuitive simply to use the arrangement 10 together with a suitable sealing structure to achieve effective ink ejection and sealing. The reason for this is that it would appear that the actuator arm 16, the connecting formation 24 and the ink-ejecting member 14 could be in the form of a unitary structure. However, the Applicant has found that it is not possible to achieve a working configuration as shown by using MEMS-based fabrication techniques. In particular, it has been found by the Applicant that such a unitary structure does not lend itself to such fabrication techniques.

It follows that the Applicant has been led to conceive the present invention.

SUMMARY OF THE INVENTION

According to one aspect of the present disclosure, a micro-electromechanical nozzle arrangement for a printhead integrated circuit the nozzle arrangement comprises a nozzle chamber bounded by a distal sidewall and a proximal sidewall, and capped by a roof defining an ink ejection port; a paddle located in the nozzle chamber below the ink ejection port; an actuator arm positioned outside of the nozzle chamber in the vicinity of the proximal sidewall, the actuator arm having a fixed end fixed to a substrate of the nozzle arrangement and a working end displaceable towards and away from the substrate; and a motion transmitting structure interconnecting the working end of the actuator arm and the paddle. The motion transmitting structure defines part of the proximal sidewall.

DETAILED DESCRIPTION OF THE INVENTION

Figure 1:
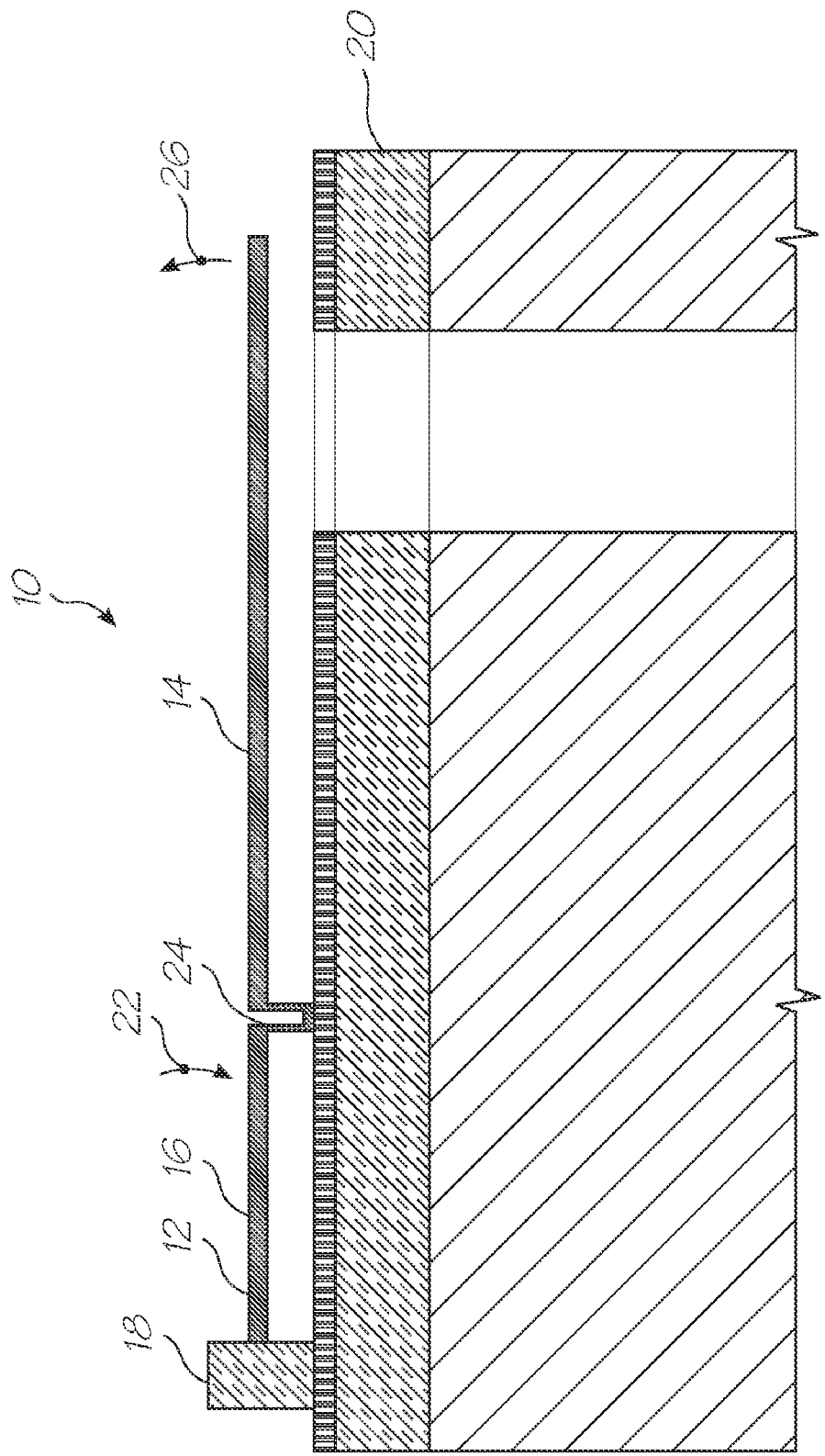
FIG. 1 shows a schematic side sectioned view of part of a nozzle arrangement of a printhead chip for an inkjet printhead for the purposes of conceptual illustration.
Figure 2:
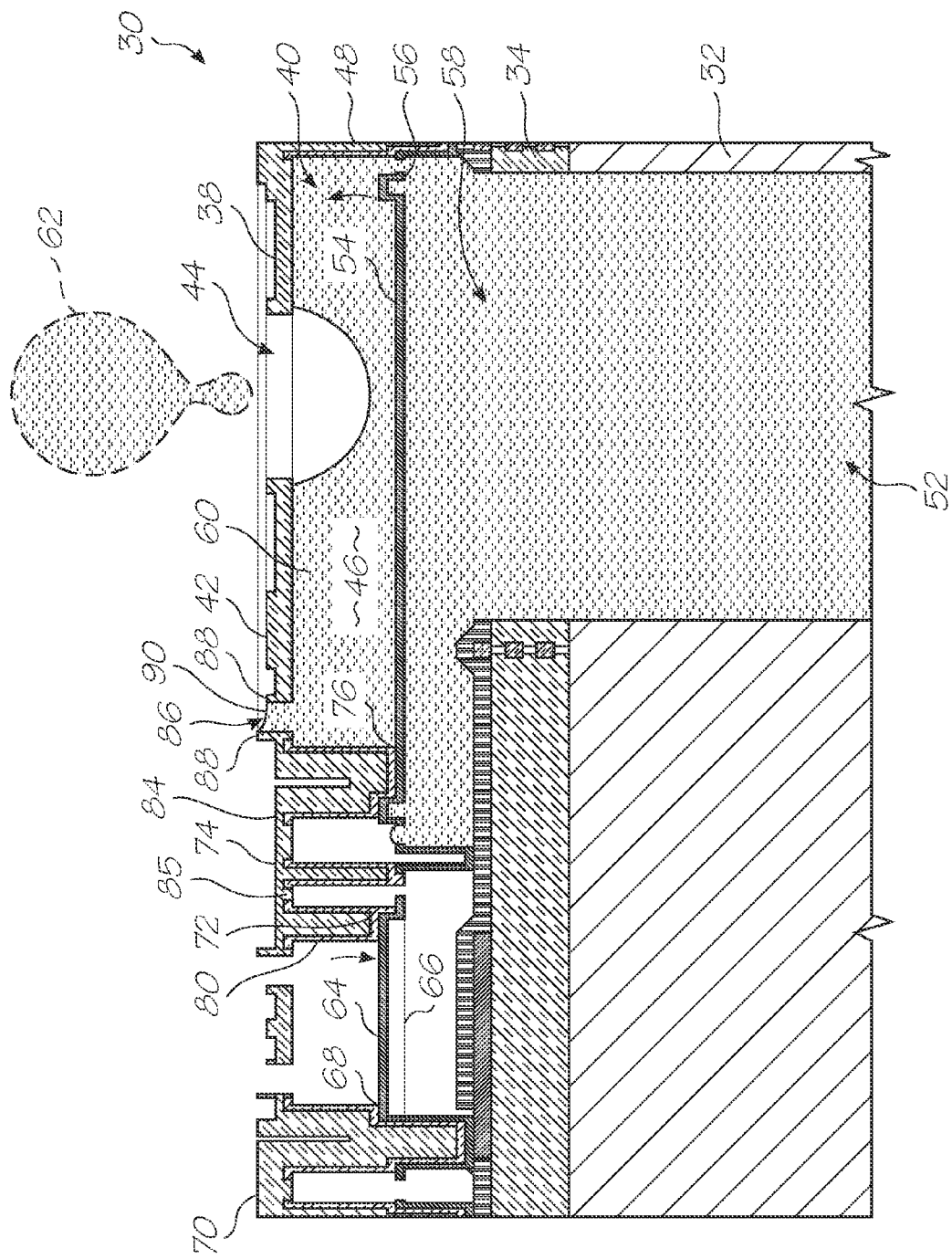
FIG. 2 shows a schematic side sectioned view of a nozzle arrangement of a first embodiment of a printhead chip, in accordance with the invention, for an inkjet printhead.

In FIG. 2, reference numeral 30 generally indicates a nozzle arrangement of a first embodiment of an ink jet printhead chip, in accordance with the invention, for an inkjet printhead.

The nozzle arrangement 30 is one of a plurality of such nozzle arrangements formed on a silicon wafer substrate 32 to define the printhead chip of the invention. As set out in the background of this specification, a single printhead can contain up to 84 000 such nozzle arrangements. For the purposes of clarity and ease of description, only one nozzle arrangement is described. It is to be appreciated that a person of ordinary skill in the field can readily obtain the printhead chip by simply replicating the nozzle arrangement 30 on the wafer substrate 32.

The printhead chip is the product of an integrated circuit fabrication technique. In particular, each nozzle arrangement 30 is the product of a MEMS-based fabrication technique. As is known, such a fabrication technique involves the deposition of functional layers and sacrificial layers of integrated circuit materials. The functional layers are etched to define various moving components and the sacrificial layers are etched away to release the components. As is known, such fabrication techniques generally involve the replication of a large number of similar components on a single wafer that is subsequently diced to separate the various components from each other. This reinforces the submission that a person of ordinary skill in the field can readily obtain the printhead chip of this invention by replicating the nozzle arrangement 30.

An electrical drive circuitry layer 34 is positioned on the silicon wafer substrate 32. The electrical drive circuitry layer 34 includes CMOS drive circuitry. The particular configuration of the CMOS drive circuitry is not important to this description and has therefore been shown schematically in the drawings. Suffice to say that it is connected to a suitable microprocessor and provides electrical current to the nozzle arrangement 30 upon receipt of an enabling signal from said suitable microprocessor. An example of a suitable microprocessor is described in the above referenced patents/patent applications. It follows that this level of detail will not be set out in this specification.

An ink passivation layer 36 is positioned on the drive circuitry layer 34. The ink passivation layer 36 can be of any suitable material, such as silicon nitride.

The nozzle arrangement 30 includes a nozzle chamber structure 38. The nozzle chamber structure 38 defines a nozzle chamber 40 and has a roof 42 that defines an ink ejection port 44.

The nozzle chamber structure 38 includes a pair of opposed sidewalls 46, a distal end wall 48 and a proximal end wall 50 so that the nozzle chamber 40 is generally rectangular in plan.

A plurality of ink inlet channels 52 are defined through the silicon wafer substrate 32, the drive circuitry layer 34 and the ink passivation layer 36. One ink inlet channel 52 is in fluid communication with each respective nozzle chamber 40. Further, each ink inlet channel 52 is aligned with each respective ink ejection port 44.

The nozzle arrangement 30 includes an ink-ejecting member in the form of a paddle 54. The paddle 54 is dimensioned to correspond generally with the nozzle chamber 40. Further, the paddle 54 has a distal end portion 56 that is interposed between an opening 58 of the ink inlet channel 52 and the ink ejection port 44. The paddle 54 is angularly displaceable within the nozzle chamber 40 so that the distal end portion 56 can move towards and away from the ink ejection port 44. Thus, when the nozzle chamber 40 is filled with ink 60, such movement of the paddle 54 results in a fluctuation of ink pressure within the nozzle chamber 40 so that an ink drop 62 is ejected from the ink ejection port 44. The mechanism of ink drop ejection is fully set out in the above referenced applications and patents. It follows that this detail is not set out in this specification.

The nozzle arrangement 30 includes an actuator in the form of a thermal bend actuator 64. This form of actuator is also described in the above referenced applications and patents and is therefore not described in further detail in this specification. Briefly, however, the thermal bend actuator 64 includes an actuator arm 66 that has a fixed end 68 that is fixed to an anchor 70 and a working end 72 that is displaceable towards and away from the substrate 32 upon receipt of a drive signal in the form of a current pulse emanating from the drive circuitry layer 34.

The nozzle arrangement 30 includes a sealing structure 78 that is interposed between the working end 72 of the actuator arm 66 and a proximal end portion 76 of the paddle 54. The actuator arm 66, the sealing structure 78 and the paddle 54 are the product of a deposition and etching process carried out with a single material. However, the arm 66, the sealing structure 78 and the paddle 54 are discrete components. This facilitates fabrication of the nozzle arrangement 30.

The material can be any of a number of materials used in integrated circuit fabrication processes. However, it is a requirement that the material have a coefficient of thermal expansion that is such that the material is capable of expansion and contraction when heated and subsequently cooled to an extent sufficient to perform work on a MEMS scale. Further, it is preferable that the material be resiliently flexible. The Applicant has found that titanium aluminum nitride (TiAlN) is particularly suited for the task.

The nozzle arrangement 30 includes a motion-transmitting structure 74 that interconnects the working end 72 of the actuator arm 66 and the proximal end portion 76 of the paddle 54. The motion-transmitting structure 74 bridges the sealing structure 78 so that the sealing structure 78 is interposed between at least a portion of the motion-transmitting structure 74 and the sealing structure 78.

The motion-transmitting structure 74 includes an effort formation 80 that extends from the working end 72 of the actuator arm 66. The motion-transmitting structure 74 also includes a load formation 82 that extends from the proximal end portion 76 of the paddle 54. A lever arm formation 84 interconnects the effort and load formations 80, 82. The lever arm formation 84 is pivotally connected between the sidewalls 46 with connectors in the form of opposed flexural connectors 85. The flexural connectors 85 are configured to experience torsional distortion upon pivotal movement of the lever arm formation 84. It will therefore be appreciated that, upon reciprocal movement of the working end 72 of the actuator arm 66, the lever arm formation 84 pivots. This pivotal movement results in the angular displacement of the paddle 54, as described above, via the load formation 82.

The motion-transmitting structure 74 and the roof 42 define a slotted opening 86 that accommodates relative movement of the structure 74 and the roof 42. The slotted opening 86 is interposed between a pair of ridges 88 that extend from the structure 74 and the roof 42. The ridges 88 are dimensioned so that, when the nozzle chamber 40 is filled with the ink 60, a fluidic seal 90 is defined between the ridges 88. Similarly, the sealing structure 78 and the proximal end portion 76 of the paddle 54 are configured so that a fluidic seal 92 is defined between the proximal end portion 76 and the sealing structure 78.

Figure 3:
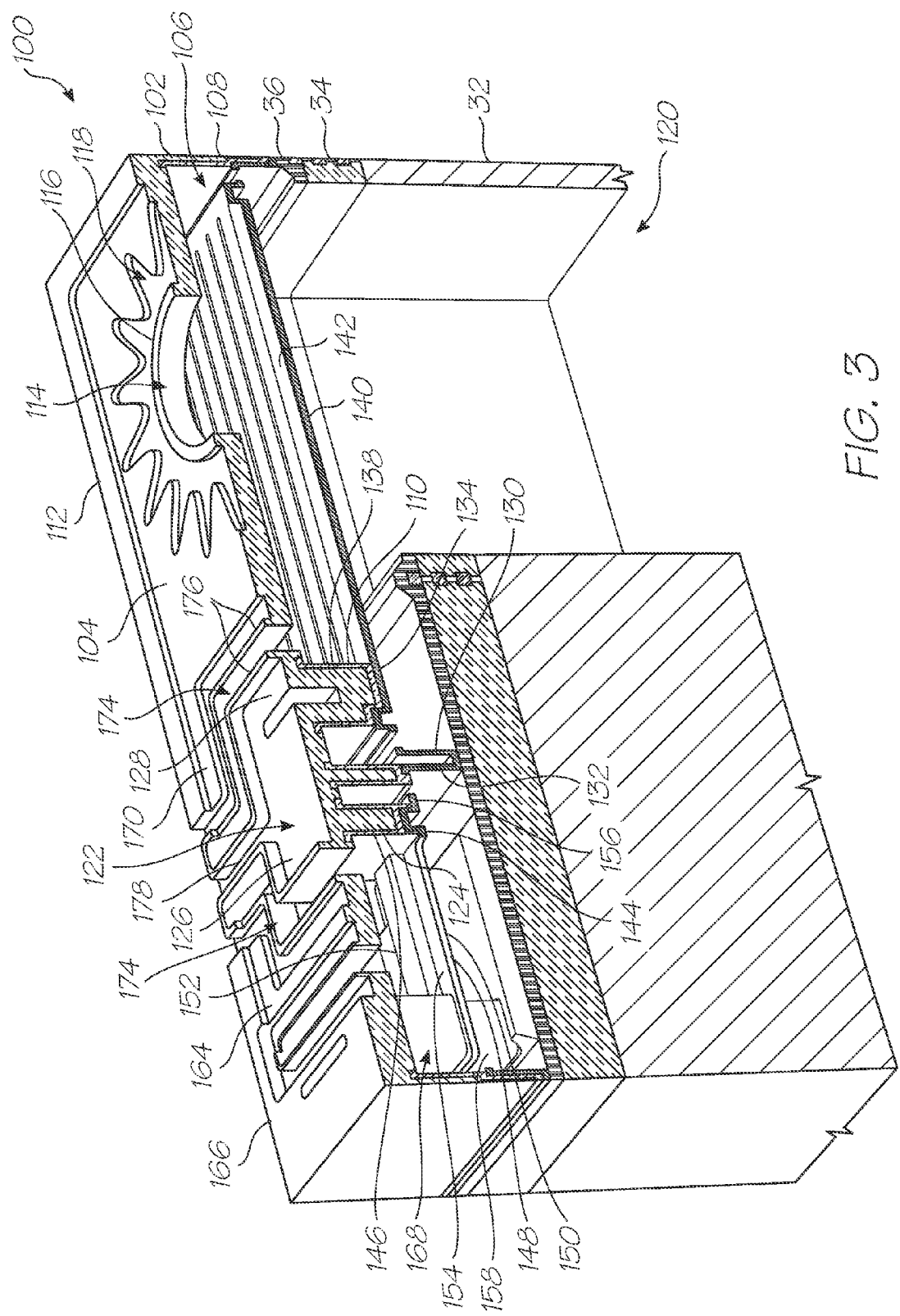
FIG. 3 shows a three dimensional, side sectioned view of a nozzle arrangement of a second embodiment of a printhead chip, in accordance with the invention, for an inkjet printhead.
Figure 4:
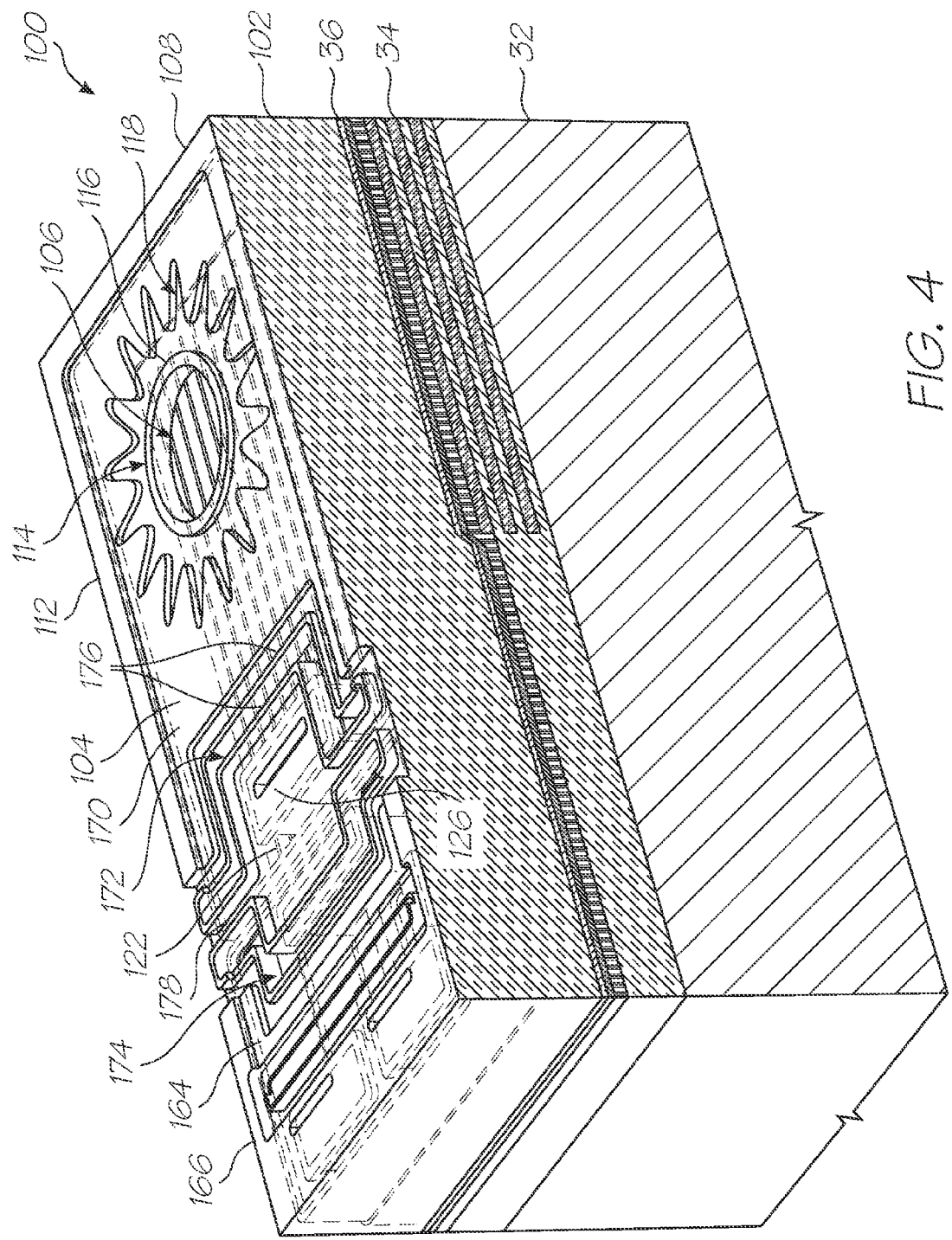
FIG. 4 shows a three dimensional view of the nozzle arrangement of FIG. 3.

In FIGS. 3 and 4, reference numeral 100 generally indicates a nozzle arrangement of an inkjet printhead chip, in accordance with the invention, for an inkjet printhead. With reference to FIG. 2, like reference numerals refer to like parts, unless otherwise specified.

The nozzle arrangement 100 includes nozzle chamber walls 102 positioned on the ink passivation layer 36. A roof 104 is positioned on the nozzle chamber walls 102 so that the roof 104 and the nozzle chamber walls 102 define a nozzle chamber 106. The nozzle chamber walls 102 include a distal end wall 108, a proximal end wall 110 and a pair of opposed sidewalls 112. An ink ejection port 114 is defined in the roof 104 to be in fluid communication with the nozzle chamber 106. The roof 104 defines a nozzle rim 116 and a recess 118 positioned about the rim 116 to inhibit ink spread.

The walls 102 and the roof 104 are configured so that the nozzle chamber 106 is rectangular in plan.

A plurality of ink inlet channels 120, one of which is shown in the drawings, are defined through the substrate 32, the drive circuitry layer 34 and the ink passivation layer 36. The ink inlet channel 120 is in fluid communication with the nozzle chamber 106 so that ink can be supplied to the nozzle chamber 106.

The nozzle arrangement 100 includes a motion-transmitting structure 122. The motion-transmitting structure 122 includes an effort formation 124, a lever arm formation 126 and a load formation 128. The lever arm formation 126 is interposed between the effort formation 124 and the load formation 128.

The nozzle arrangement 100 includes a sealing structure 130 that is fast with the ink passivation layer 36. In particular, the sealing structure 130 is composite with a primary layer 132 and a secondary layer 134. The layers 132, 134 are configured so that the sealing structure 130 is resiliently deformable to permit pivotal movement of the lever arm formation 126 with respect to the substrate 32. The layers 132, 134 can be of a number of materials that are used in integrated circuit fabrication. The Applicant has found that titanium aluminum nitride (TiAlN) is a suitable material for the layer 132 and that titanium is a suitable material for the layer 134.

The load formation 128 defines part of the proximal end wall 110. The load formation 128 is composite with a primary layer 136 and a secondary layer 138. As with the sealing structure 130, the layers 136, 138 can be of any of a number of materials that are used in integrated circuit fabrication. However, as set out above, successive deposition and etching steps are used to fabricate the nozzle arrangement 100. It follows that it is convenient for the layers 136, 138 to be of the same material as the layers 132, 134. Thus, the layers 136, 138 can be of TiAlN and titanium, respectively.

The nozzle arrangement 100 includes an ink-ejecting member in the form of an elongate rectangular paddle 140. The paddle 140 is fixed to the load formation 128 and extends towards the distal end wall 108. Further, the paddle 140 is dimensioned to correspond generally with the nozzle chamber 106. It follows that displacement of the paddle 140 towards and away from the ink ejection port 114 with sufficient energy results in the ejection of an ink drop from the ink ejection port. The manner in which drop ejection is achieved is described in detail in the above referenced patents/applications and is therefore not discussed in any detail here.

To facilitate fabrication, the paddle 140 is of TiAlN. In particular, the paddle 140 is an extension of the layer 136 of the load formation 128 of the motion-transmitting structure 122.

The paddle 140 has corrugations 142 to strengthen the paddle 140 against flexure during operation.

The effort formation 124 is also composite with a primary layer 144 and a secondary layer 146.

The layers 144, 146 can be of any of a number of materials that are used in integrated circuit fabrication. However, as set out above, successive deposition and etching steps are used to fabricate the nozzle arrangement 100. It follows that it is convenient for the layers 144, 146 to be of the same material as the layers 132, 134. Thus, the layers 144, 146 can be of TiAlN and titanium, respectively.

The nozzle arrangement 100 includes an actuator in the form of a thermal bend actuator 148. The thermal bend actuator 148 is of a conductive material that is capable of being resistively heated. The conductive material has a coefficient of thermal expansion that is such that, when heated and subsequently cooled, the material is capable of expansion and contraction to an extent sufficient to perform work on a MEMS scale.

The thermal bend actuator 148 can be any of a number of thermal bend actuators described in the above patents/patent applications. In one example, the thermal bend actuator 148 includes an actuator arm 150 that has an active portion 152 and a passive portion. The active portion 152 has a pair of inner legs 154 and the passive portion is defined by a leg positioned on each side of the pair of inner legs 154. A bridge portion 156 interconnects the active inner legs 154 and the passive legs. Each leg 154 is fixed to one of a pair of anchor formations in the form of active anchors 158 that extend from the ink passivation layer 36. Each active anchor 158 is configured so that the legs 154 are electrically connected to the drive circuitry layer 34.

Each passive leg is fixed to one of a pair of anchor formations in the form of passive anchors 160 that are electrically isolated from the drive circuitry layer 34.

Thus, the legs 154 and the bridge portion 156 are configured so that when a current from the drive circuitry layer 34 is set up in the legs 154, the actuator arm 150 is subjected to differential heating. In particular, the actuator arm 150 is shaped so that the passive legs are interposed between at least a portion of the legs 154 and the substrate 32. It will be appreciated that this causes the actuator arm 150 to bend towards the substrate 32.

The bridge portion 156 therefore defines a working end of the actuator 148. In particular, the bridge portion 156 defines the primary layer 144 of the effort formation 124. Thus, the actuator 148 is of TiAlN. The Applicant has found this material to be well suited for the actuator 148.

The lever arm formation 126 is positioned on, and fast with, the secondary layers 134, 138, 146 of the sealing structure 130, the load formation 128 and the effort formation 124, respectively. Thus, reciprocal movement of the actuator 148 towards and away from the substrate 32 is converted into reciprocal angular displacement of the paddle 140 via the motion-transmitting structure 122 to eject ink drops from the ink ejection port 114.

Each active anchor 158 and passive anchor is also composite with a primary layer 160 and a secondary layer 162. The layers 160, 162 can be of any of a number of materials that are used in integrated circuit fabrication. However, in order to facilitate fabrication, the layer 160 is of TiAlN and the layer 162 is of titanium.

A cover formation 164 is positioned on the anchors to extend over and to cover the actuator 148. Air chamber walls 166 extend between the ink passivation layer 36 and the cover formation 164 so that the cover formation 164 and the air chamber walls 166 define an air chamber 168. Thus, the actuator 148 and the anchors are positioned in the air chamber 168.

The cover formation 164, the lever arm formation 126 and the roof 104 are in the form of a unitary protective structure 170 to inhibit damage to the nozzle arrangement 100.

The protective structure 170 can be one of a number of materials that are used in integrated circuit fabrication. The Applicant has found that silicon dioxide is particularly useful for this task.

It will be appreciated that it is necessary for the lever arm formation 126 to be displaced relative to the cover formation 164 and the roof 104. It follows that the cover formation 164 and the lever arm formation 126 are demarcated by a slotted opening 172 in fluid communication with the air chamber 168. The roof 104 and the lever arm formation 126 are demarcated by a slotted opening 174 in fluid communication with the nozzle chamber 106.

The lever arm formation 126 and the roof 104 together define ridges 176 that bound the slotted opening 172. Thus, when the nozzle chamber 106 is filled with ink, the ridges 176 define a fluidic seal during ink ejection. The ridges 176 serve to inhibit ink spreading by providing suitable adhesion surfaces for a meniscus formed by the ink.

The slotted openings 172, 174 demarcate resiliently flexible connectors in the form of a pair of opposed flexural connectors 178 defined by the protective structure 170. The flexural connectors 178 are configured to experience torsional deformation in order to accommodate pivotal movement of the lever arm formation 126 during operation of the nozzle arrangement 100. The silicon dioxide of the protective structure 170 is resiliently flexible on a MEMS scale and is thus suitable for such repetitive distortion.

It should be noted that the paddle 140, the sealing structure 130 and the actuator arm 150 are discrete components. This facilitates fabrication of the nozzle arrangement 100 while still retaining the advantages of efficient motion transfer and sealing.

I claim:

1. A micro-electromechanical nozzle arrangement for a printhead integrated circuit the nozzle arrangement comprising:
    a nozzle chamber bounded by a distal sidewall and a proximal sidewall, and capped by a roof defining an ink ejection port;
    a paddle located in the nozzle chamber below the ink ejection port;
    an actuator arm positioned outside of the nozzle chamber in the vicinity of the proximal sidewall, the actuator arm having a fixed end fixed to a substrate of the nozzle arrangement and a working end displaceable towards and away from the substrate; and
    a motion transmitting structure interconnecting the working end of the actuator arm and the paddle, wherein
    the motion transmitting structure defines part of the proximal sidewall.

2. The nozzle arrangement of claim 1, wherein the motion-transmitting structure includes an effort formation in engagement with the working end of the actuator arm, and a load formation in engagement with the paddle.

3. The nozzle arrangement of claim 2, wherein the motion-transmitting structure further comprises a lever arm formation interconnecting the effort and load formations.

4. The nozzle arrangement of claim 1, wherein the motion-transmitting structure and a roof of the nozzle chamber define a slotted opening for accommodating relative movement of the motion transmitting structure and the roof.

5. The nozzle arrangement of claim 4, wherein the slotted opening is interposed between a pair of ridges extending from the motion-transmitting structure and the roof, said ridges dimensioned to effect formation of a fluidic seal between the ridges.

* * * * *